United States Patent Office.

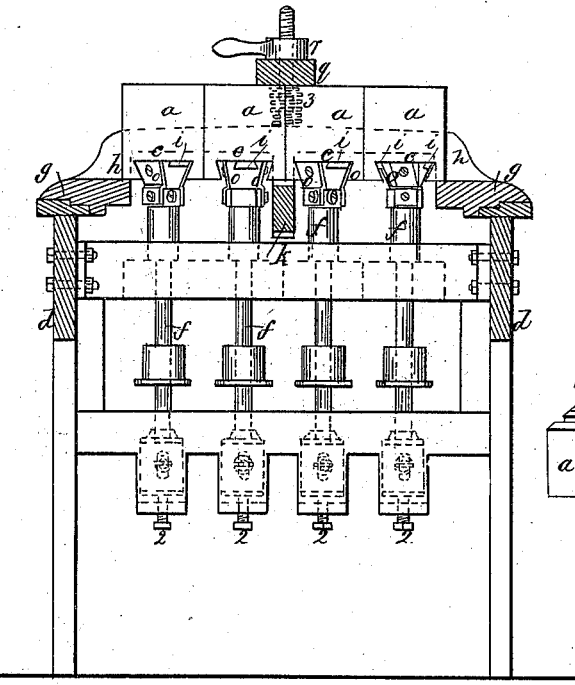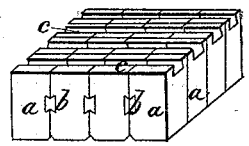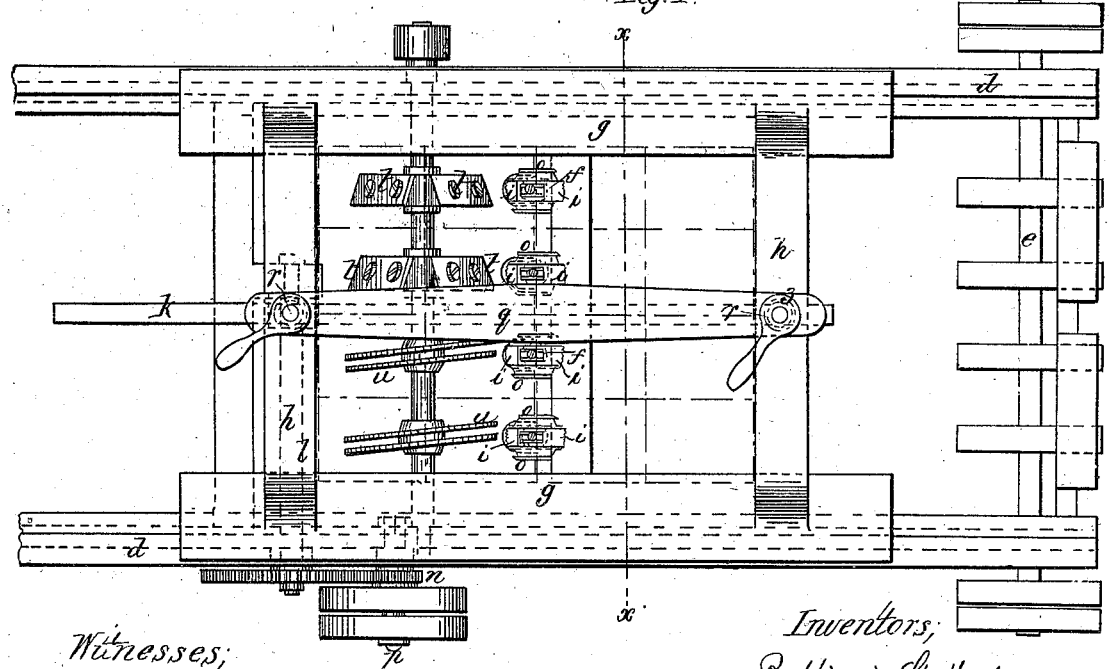

WILLIAM O. ROBBINS AND CHARLES W. STAFFORD, OF NEW YORK, N. Y.

Letters Patent No. 97,554, dated December 7, 1869.

---

IMPROVEMENT IN MACHINERY FOR PREPARING WOODEN BLOCKS FOR PAVEMENT.

The Schedule referred to in these Letters Patent and making part of the same.

---

*To all whom it may concern:*

Be it known that we, WILLIAM O. ROBBINS and CHARLES W. STAFFORD, of the city and State of New York, have invented, made, and applied to use a certain new and useful Improvement in Machinery for Preparing Wooden Blocks for Pavements; and we do hereby declare the following to be a full, clear, and exact description of the said invention, reference being had to the annexed drawing, making part of this specification, wherein—

Figure 1 is a plan of the machine complete.

Figure 2 is a cross-section of the machine, at the line $x\ x$, showing the dovetail-cutters, as acting in the wood.

Figure 3 is a perspective view of a section of pavement, inverted, showing the grooves cut in the same for the reception of keys or wedges.

Similar marks of reference denote the same parts.

This machine is for the purpose of cutting, into the under side of wooden pavement-blocks, dovetail grooves, to receive keys that hold the blocks together, and form sections for paving streets.

The wooden blocks $a\ a$, to be grooved, are previously prepared by cutting dovetail grooves in their sides, and introducing keys, as seen at $b\ b$, figs. 2 and 3; then the section thus keyed together is grooved upon its under surface, as at $c\ c$, to receive keys running at right angles to the keys $b\ b$, so as to tie all the blocks of the section together in the most firm manner.

Our invention relates to the peculiar construction of the tools employed for forming dovetail grooves, and also to the mechanism that is combined therewith, for holding the section of paving-blocks, and presenting them to the action of the grooving-tools.

In the drawing—

$d$ is the frame, carrying the shaft $e$, driven by competent power, from which belts pass to the vertical spindles $f$, upon the upper ends of which is a head, with cutters $i$ at the top, and on the sides are cutters $o$. The shape and size of each of these heads are such, that the cutter or cutters $i$ describe a circle, whose diameter is equal to the width of the bottom surface of the dovetail groove $c$, and the edges of the cutters $o$ are inclined, so as to dress off the interior inclined surfaces of the dovetail groove.

The cutters $o$ are made movable, so as to set them out as they are worn by sharpening, and the cutters $i$ are made single, or in pairs, on each head, the cutting-edges being made like the section of a crosscut-saw, to give a smooth bottom to the groove, as the cutters revolve with great rapidity.

The spindles $f$ are placed at the proper distance apart, to groove the ranges of blocks, and the step of each spindle is made adjustable, so as to be raised or lowered by the screw 2, to cut a deep or shallow groove.

Upon the top of the frame $d$, a slide-frame is fitted, composed of the side pieces $g$, cross-pieces $h$, and longitudinal rack-bar $k$.

The rack of this bar is operated upon by a pinion upon the shaft $l$, that receives motion either by a crank on said shaft, or the gear-wheels $n$, from the shaft $p$.

The section of paving-blocks is laid with its edges upon the side pieces $g$, as seen by red lines, fig. 1, and there secured by the clamp-bar $q$ and nuts $r$. This operation brings the section of paving-blocks to a level, and removes any wind that may have resulted from the introduction of the keys $b$.

The section of paving-blocks might now be moved along over the revolving heads and spindles $f$, so as to groove the same upon the under surface, (as at $c$.) We, however, prefer and employ a series of revolving tools to first rough out the groove, and leave the cutters $i$ and $o$ the less labor of finishing the groove.

The roughing-tools may be revolving cutters $t$, made of chisels bolted upon stocks, or "drunken saws," $u\ u$, may be employed to saw a kerf sufficiently wide to leave the cutters $i$ and $o$ only the work of finishing the dovetail portion of the groove, and dressing the bottom thereof.

The frame that carries the section of paving may be moved along, and then back again, and stopped, for removing one section and placing in another.

The springs 3 serve to raise and release the clamp $q$, when the nuts are released.

What we claim, and desire to secure by Letters Patent, is—

The vertical cutters and spindles $f\ i$, and horizontal revolving cutters $t$ or $u$, in combination with the reciprocating carriage $g\ h\ k$, all the parts being constructed and arranged to operate substantially as described and for the purposes set forth.

In witness whereof, we have hereunto signed our signatures, this 9th day of October, 1868.

WM. O. ROBBINS.
C. W. STAFFORD.

Witnesses:
CHAS. H. SMITH,
GEO. D. WALKER.